United States Patent Office 2,856,440
Patented Oct. 14, 1958

2,856,440

FLUORINE CONTAINING CO-TELOMERS

Nikolaus E. Wolff, Manor Park, Del., assignor to E. I. du Pont de Nemours and Company, Wilmington, Del., a corporation of Delaware No Drawing. Application June 17, 1955
Serial No. 516,310

12 Claims. (Cl. 260—653)

This invention relates to new fluorine-containing co-telomers and to a process for making them from a hydrocarbon telogen and a mixture of at least two different polyfluoro-monoolefins, and particularly to liquid co-telomers which have unusual properties which render them especially valuable for use as hydraulic fluids and as lubricants over a wide range of temperatures.

A serious problem facing lubrication engineers is to obtain materials which not only have good lubricity and can take high loads, but which show hydrolytic, thermal and oxidative stability. It is known that completely fluorinated hydrocarbons are exceedingly stable and that some of them have lubricating properties. However, they also have properties which have seriously limited their utility. It has been proposed to prepare lubricants by complete fluorination of hydrocarbon oils. This is illustrated by the article by Struve et al. in Ind. and Eng. Chemistry, vol. 39, No. 3 (March 1947), pages 352–354, wherein the product is shown to have a very low viscosity index of −674, a very high viscosity of 536 centistokes at 100° F., the consistency of molasses when cold, and to contain solid fluorocarbons at temperatures below 50° C.

It has also been proposed to produce high fluorine-containing products by the polymerization of fluorine-containing olefins. In general, such polymers are solids. However, it has been found that if certain fluoro-olefins are polymerized in the presence of certain saturated compounds, called telogens, such compounds will react with end carbons of the polymer chains before they have reached their maximum length to terminate such chains and form compounds known as telomers. In many cases, the telomers are solids. However, in some cases, liquid telomers are produced which have been disclosed to have lubricating properties and to be useful as lubricants. Representative telomers, their preparation and their properties are disclosed by Miller et al. in Ind. and Eng. Chem., vol. 39, No. 3 (March 1947), pages 333 to 337. Such telomers contain unsaturation and loosely held chlorine and other groups, whereby they are unstable and require an after-fluorination treatment to stabilize them. The stabilized telomers contain chlorine which decreases their stability at high temperatures and is reactive with many metals, particularly copper, whereby they are corrosive at high temperatures. Also, such telomers have quite low viscosity indices and are liquid over a limited temperature range. In addition, telomers have been prepared from tetrafluoroethylene and hydrocarbon telogens, including isobutane. Such telomers are greasy waxes or relatively low boiling liquids having a limited liquid range.

Also, co-telomers have been prepared from mixtures of chlorotrifluoroethylene and tetrafluoroethylene employing chloroform or carbon tetrachloride as the telogen. Such co-telomers also require an after-fluorination to stabilize them. They are semi-solid at ordinary room temperatures and contain chlorine.

It is an object of this invention to provide novel, fluorine-containing co-telomers, particularly such co-telomers which are liquid over a more extended range of temperatures, especially at very low temperatures, and which are stable and non-corrosive at high temperatures in the presence of water, oxygen and copper. A particular object is to provide co-telomers of such character which are high-boiling liquids that have good lubricating properties at high loads as well as at low loads and which are specially useful as lubricants at extreme ranges of temperature. Another object is to provide a simple one-step process for preparing such co-telomers from low cost, readily available materials. Other objects are to provide new compositions of matter and to advance the art. Still other objects will appear hereinafter.

The above and other objects may be accomplished in accord with this invention which comprises co-telomers containing between 23% and 73% by weight of fluorine each of which consists of one unit of a telogen radical which is a radical of an alkane of 4–18 carbon atoms containing at least one tertiary carbon atom for every 3–6 non-tertiary carbon atoms and at least 1 polymer chain terminated at one end by a tertiary carbon atom of the telogen unit and at the other end by hydrogen, each polymer chain consisting of at least one polyfluoro unit of the structure

wherein R is a member of the group consisting of fluorine, lower perfluoroalkyl and lower omega-hydroperfluoroalkyl groups and each X is a member of the group consisting of fluorine and hydrogen, at least one of said polymer chains consisting of at least 2 different polyfluoro units; and to the process for preparing such co-telomers and other valuable products which comprises reacting, in the presence of a free radical catalyst, a telogen which is an alkane of 4–18 carbon atoms containing at least one tertiary carbon atom for every 3–6 non-tertiary carbon atoms with a mixture of at least 2 polyfluoro-monoolefins of the formula

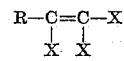

wherein R is a member of the group consisting of fluorine, lower perfluoroalkyl and lower omega-hydroperfluoroalkyl groups and each X is a member of the group consisting of fluorine and hydrogen, said mixture containing at least 29 mole percent of one polyfluoro-monoolefin and at least 15 mole percent of a different polyfluoro-monoolefin.

The process of this invention is simple and straightforward. The usual procedure involves placing the desired amounts of the hydrocarbon telogen, of the mixture of polyfluoro-monoolefins and of the free radical catalyst into a pressure reaction vessel and then closing the reaction vessel and heating to the desired reaction temperature while mechanically agitating the reaction vessel for several hours. The temperature at which the reaction is effected may be varied over a wide range depending primarily upon the nature of the reactants, the catalyst, and the other conditions of the reaction, as known in the preparation of telomers. Normally, the temperature will be in the range of from about 75° C. to about 200° C., preferably about 110° C. Temperatures down to about 0° C. may be employed with a catalyst which readily yields free radicals at such temperatures, such as trichloroacetyl peroxide. Temperatures materially above 200° C. contribute nothing to the reaction rate. For any particular charge, it is desirable to operate at a temperature below the pyrolysis temperature of the telogen and of the polyfluoro-monoolefins.

The products of the reaction vary from liquids to waxes, depending upon the hydrocarbon telogen and the number and kind of polyfluoro-monoolefins employed.

The liquid products are separated from the waxes by simple fractional distillation and, if desired, into definite fractions of limited boiling ranges.

Usually, there is obtained a small amount of low boiling telomers of the individual polyfluoro-monoolefins. However, a large majority of the products are co-telomers containing between 23% and 73% by weight of fluorine and consisting of a single unit of a telogen radical derived from the hydrocarbon telogen, and at least one polymer chain which is terminated at one end by a tertiary carbon atom of the telogen unit and at the other end by a hydrogen atom displaced from the telogen and which polymer chain contains at least two different polyfluoro units derived from the different polyfluoro-monoolefins. When the telogen contains only one tertiary carbon atom, the co-telomers will contain only one such polymer chain. When the telogen contains two or more tertiary carbon atoms, the co-telomers may contain more than one of such polymer chains or one or more of such polymer chains together with polymer chains composed of one or more units derived from a single polyfluoro-monoolefin.

The co-telomers show no unsaturation when tested with permanganate and are stable at high temperatures, hence do not require any after-fluorination to stabilize them. The liquid co-telomers, particularly the high-boiling liquids, are especially valuable and are obtained in high yields whereas the yields of the less valuable waxes are low. The liquid co-telomers have utility as non-flammable, non-corrosive hydraulic fluids, as snuffer agents for flammable solvents, and as lubricants. They are thermally and chemically stable and have an unusually extended liquid range, i. e. have low pour points and high boiling points and are free of solid polymeric products, whereby they are useful at extremes of temperature at which other hydraulic fluids and lubricants lose their utility. As lubricants, they have good lubricity, and can take unexpectedly high loads, and have higher viscosity indices than prior highly fluorinated lubricants. The waxes are useful as lubricants, polishes, mold release agents, and impregnants for paper to render it water and oil repellent.

The telogens, to be employed in this invention, must be an alkane of 4–8 carbon atoms which contains at least one tertiary carbon atom for every 3–6 non-tertiary carbon atoms, preferably in alkane of 4–6 carbon atoms containing a single tertiary carbon atom. The term "alkane" is used in its strict sense to include only fully saturated aliphatic hydrocarbons. The presence in the telogen of an aryl radical, as in isopropylbenzene, results in the production of little or no liquid co-telomers and such liquids do not possess the advantageous properties of the liquid co-telomers of this invention. In order to provide co-telomers of maximum stability and other desired properties, the hydrocarbon portion (telogen unit) of the co-telomer should be kept at the minimum proportion of the total weight of the co-telomer. The polymer chains, composed of the polyfluoro units, replace the single hydrogen atoms on the tertiary carbon atoms of the telogen. Therefore, when the telogen contains only one tertiary carbon atom, it should not contain more than six carbon atoms, and, when the telogen contains more than six carbon atoms, it should contain additional tertiary carbon atoms so as to provide points of attachment for additional polymer chains. Representative telogens, useful in this invention, are isobutane, isopentane, isohexane, 2,3-dimethylbutane, 2,3-dimethylpentane, 2,4-dimethylpentane, 2,3,4-trimethylpentane, 3-ethyl-2-methylpentane, 2,5-dimethylhexane, 2,6-dimethylheptane, 2,7-dimethyloctane, etc.

The olefins, employed in this invention, are the polyfluoro-monoolefins of the formula

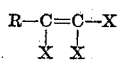

wherein R is a member of the group consisting of fluorine, lower perfluoroalkyl and lower omega-hydroperfluoroalkyl groups and each X is a member of the group consisting of fluorine and hydrogen. A "polyfluoro-monoolefin" is used in its strict sense to mean an olefin which contains at least 2 fluorine atoms and only one unsaturated bond that is an ethylenically unsaturated bond. Polyolefins, such as diolefins, tend to produce unsaturated products. All of the fluorine atoms may be in R. However, when R is fluorine, at least one X must also be fluorine. A "perfluoroalkyl" group is an alkyl group in which all hydrogen atoms have been replaced by fluorine, i. e. it consists of carbon and fluorine. An "omega-hydroperfluoroalkyl" group is an alkyl group in which all hydrogen atoms, except a single hydrogen atom on the terminal carbon atom furthest removed from the double bond, have been replaced by fluorine. The term "lower," as applied to the aforesaid groups, means groups which contain at least 1 but not more than 4 carbon atoms. Representative polyfluoro-monoolefins, which are useful in this invention, include tetrafluoroethylene, hexafluoropropene, vinylidene fluoride, trifluoroethylene, 3,3,3-trifluoropropene-1, perfluorobutene-1, perfluoropentene-1, perfluorohexene-1, omega-hydroperfluoro-hexene-1, 1,3,3,3-tetrafluoropropene-1, 2,3,3,3-tetrafluoropropene-1, 1,1,3,3,3-pentafluoropropene-1, 1,2,3,3,3-pentafluoropropene-1, 3,3-difluoropropene-1, and the like.

In order to obtain the advantageous results and the valuable co-telomers of this invention, it is essential to use a mixture of at least two different polyfluoro-monoolefins of the specified structure in the process. Such mixture should contain at least 29 mole percent of one polyfluoro-monoolefin and at least 15 mole percent of a different polyfluoro-monoolefin, the rest of the mixture (56 mole percent) being composed of either or both of those two polyfluoro-monoolefins or, in whole or in part, of one or more other polyfluoro-monoolefins of the structure hereinbefore specified. The mixture may be composed wholly of polyfluoro-monoolefins in which each X is fluorine, i. e. perfluoro-monoolefins and omega-hydroperfluoro-monoolefins. However, it is much preferred that the mixture include at least one polyfluoro-monoolefin in which at least one X is hydrogen in a proportion of at least 15 mole percent of the mixture. It has been found that, in the latter case, there is obtained significantly higher yields of high-boiling liquid co-telomers and that such high-boiling liquids have lower pour points and a more extended liquid range, than when the mixture is composed wholly of polyfluoro-monoolefins in which each X is fluorine. It is further preferred that the mixture contain at least 29 mole percent of a polyfluoro-monoolefin in which at least two X's are fluorine, especially one in which each X is fluorine, and at least 15 mole percent of a different polyfluoro-monoolefin in which at least one X is hydrogen, especially one in which two X's are hydrogen.

The mixture of polyfluoro-monoolefins may consist of only two members of the class. Such mixture may contain from about 29 to about 85 mole percent of one of the polyfluoro-monoolefins and from about 71 to about 15 mole percent of the other. Usually, the two polyfluoro-monoolefins will be employed in about equi-molecular proportions. High yields of entirely satisfactory liquid co-telomers are obtained with such mixtures. However, it has been found that higher maximum yields of the higher-boiling liquid co-telomers are obtained when one or more additional polyfluoro-monoolefins, particularly those in which at least one X is hydrogen, are included in the mixture, i. e. when the mixture contains at least 3 different polyfluoro-monoolefins, preferably when at least 2 of them are polyfluoro-monoolefins in which at least one X is hydrogen. Relatively small proportions of the additional polyfluoro-monoolefins produce large effects. For example, the proportion of high-boiling liquid co-telomer in the reaction product is greatly increased by the inclusion of about 0.1 mole of a third polyfluoro-monoolefin in a mixture of 0.5 mole of each of two other different polyfluoro-monoolefins.

The preferred co-telomers of this invention are the normally liquid co-telomers which contain from about 36.8% to about 62.4% by weight of fluorine, boil in the range of from about 130° C. to about 340° C., and consist of one unit of a telogen radical which is a tertiary butyl radical and a polymer chain terminated at one end by the tertiary carbon atom of the telogen unit and at the other end by hydrogen, said polymer chain consisting essentially of at least one unit of the structure

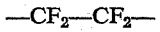

and at least one unit of the structure —CF$_2$—CH$_2$—, particularly the co-telomers which contain about 62.4% by weight of fluorine and boil in the range of from about 250° C. to about 310° C. Such co-telomers are the products of the reaction of isobutane, as a telogen, with a mixture of polyfluoro-monoolefins which mixture consists essentially of about equi-molecular proportions of tetrafluoroethylene and vinylidene fluoride, including such mixture of polyfluoro-monoolefins containing about 0.1 mole of 3,3,3-trifluoro-propene-1. The preparation of such co-telomers is illustrated by Examples 1 and 5 given hereinafter.

The ratio of telogen to the mixture of polyfluoro-monoolefins may vary considerably, and the range thereof corresponds to the known range of ratios of telogen to polyfluoro-olefins conventionally employed in the preparation of telomers of the prior art. Generally, the hydrocarbon telogen can vary from at least about 0.1 mole up to about 20 moles for each mole of the mixture of polyfluoro-monoolefins, preferably from about 1 to about 3 moles of telogen for each mole of polyfluoro-monoolefins. Excess telogen serves as a solvent for the reactants and, in general, is not objectionable so long as it does not result in too high dilution of the reactants or unduly increase the costs of the subsequent steps of separating and recovering the ingredients of the reaction mixture.

The catalyst should be a free radical catalyst, i. e. a compound which readily yields free radicals. Such catalysts are well known, particularly for the preparation of telomers of polyfluoro-olefins. The catalysts include peroxygen compounds, such as ditertiary butyl peroxide, diacyl peroxide, benzoyl peroxide, ethyl peroxide, sodium peroxide, hydrogen peroxide, oxygen, ozone, and ammonium persulfate. Also, included are tertiary butyl hydroperoxide, peracetic acid, diacetyl peroxide, trichloroacetyl peroxide, trifluoroacetyl peroxide, and the like. The preferred catalyst is ditertiary butyl peroxide. The selection of the catalyst will influence somewhat the temperature at which the reaction will be carried out, since a temperature should be used which will insure the efficient generation of free radicals and a half-life to the catalyst of about four hours. The amount of the catalyst employed will correspond with that which is known to be useful in the preparation of telomers of polyfluoro-olefins, and in accord with the known principles in connection therewith. Generally, the catalyst may be from about 0.1% to about 10% by weight based on the weight of the telogen, preferably from about 0.8% to about 10%. The lower ratios of catalyst, below about 5%, give lower conversions but higher proportions of the higher boiling liquids in the products, whereas the higher ratios of catalyst, 5% and above, give higher conversions but lower proportions of the higher boiling liquids.

The reaction may be carried out at atmospheric pressures or at super-atmospheric pressures. Usually, autogenous pressures will be used, generally of the order of 100 to 1,000 pounds per square inch gauge. Externally induced pressures up to about 10,000 pounds per square inch gauge can be used, but generally without significant improvement.

In order to more clearly illustrate this invention, preferred modes of practicing it, and advantageous results to be obtained thereby, the following examples are given, wherein the parts are by weight except where otherwise specifically indicated:

EXAMPLE 1

A stainless steel agitated reaction kettle is charged with six parts (0.04 mole) of ditertiary butyl peroxide catalyst and, after being sealed, it is cooled to about —80° C. The reaction vessel is then evacuated with a vacuum pump and 120 parts (2.08 moles) of isobutane gas condensed into the system. The temperature of the system is then raised to 110° C. and agitated. A mixture of 50 parts (0.5 mole) of tetrafluoroethylene and 38 parts (0.5 mole) of vinylidene fluoride is pressured into the system. The operating pressure of the system is between 1200 and 1300 pounds per sq. in. gauge. After a reaction time of 2½ hrs., the reaction is complete and 112 parts of white opaque liquid product removed from the reaction chamber. On distillation this product yields the following fractions in percent by weight:

Fraction A: 20.5% having a boiling range of 75–150° C.
Fraction B: 45.5% having a boiling range of 150–270° C.
Fraction C: 12.1% having a boiling range of 270–340° C.
Fraction D: 22% of a greasy wax It is evident that 78% of the total products are liquids.

Fraction A above was redistilled to yield a cut boiling at 70–90° C., which by analysis contains 50% carbon, 7.1% hydrogen and 36.8% fluorine. This liquid has a pour point below —80° C.

Fraction B was redistilled to yield a cut boiling at 160 to 200° C., which analyzes 39.3% carbon, 4.3% hydrogen, 57.9% fluorine. This material exhibits a pour point below —80° C.

Analysis of a cut redistilled from Fraction C above, boiling at 208–295° C., shows a carbon content of 35.6%, a hydrogen content of 3%, and a fluorine content of 62.4%. This product has an average molecular weight of 750 and apparently consists of 6 units of vinylidene fluoride, 3 units of tetrafluoroethylene and 1 unit of isobutane per molecule of co-telomer. The liquid has a pour point of —40° C.

The greasy wax Fraction D above analyzes 34.4% carbon, 2.7% hydrogen and 62.7% fluorine. It has a molecular weight of approximately 970 and apparently contains 8 units of vinylidene fluoride, 4 units of tetrafluoroethylene and 1 unit of isobutane per molecule. It is soluble in amyl acetate to the extent of more than 10% by weight.

Essentially the same results are obtained when the reaction is carried out at 75° C. for 12 hours or at 150° C. for 1 hour.

The simplest co-telomer from this reaction mixture consists of one unit from each of isobutane, tetrafluoroethylene, and vinylidene fluoride, which will boil at no less than about 130° C. The liquid products which boil below 130° C. are not co-telomers of this invention but appear to consist of simple, low molecular weight, telomers of the individual polyfluoro-monoolefins.

The preferred co-telomer of this example is the fraction or cut which has a boiling range of about 250° C. to about 310° C. and contains about 62.4% by weight of fluorine.

The crude product may be purified, if desired. It is often advantageous to wash it with concentrated nitric acid, followed by a wash with concentrated sulfuric acid, or a mixture of these acids. The use of these acids, either cold or warm, will assist in removing fragments of catalyst that may remain. As indicated, the product can be distilled and fractionated at atmospheric or reduced pressures. Often, it is desirable to filter the liquids through alumina to remove some color residue which often persists from catalyst fragments.

On refluxing the liquid Fractions A, B and C above 100 hours in cooper flasks and in contact with air, there is no corrosion of the copper, no detectable acidity in the liquid, and only very slight discoloration.

EXAMPLE 2

Following the general procedure of Example 1, 120 parts (2.08 moles) of isobutane, 6 parts (0.04 mole) of ditertiary-butyl-peroxide, 50 parts (0.5 mole) of tetrafluoroethylene, and 20 parts (0.208 mole) of 3,3,3-trifluoropropene-1 is charged into an agitated pressure vessel. After heating to 110° C., the initial pressure is observed to be 512 p. s. i. g. which falls as the reaction proceeds over a 5-hour period. The crude product, which is composed entirely of liquid products, consists of 90 parts of clear liquid. This is separated into three fractions by distillation:

Fraction A: 36% boiling at 85–105° C.
Fraction B: 44% boiling at 105–180° C.
Fraction C: 20% boiling at 180–290° C.

Fraction A is redistilled to yield a product boiling at 85 to 100° C., and which contains 49.7% C, 6.6% H, and 37.8% F. This material has a pour point of —80° C.

Fraction B is distilled to yield a product boiling at 150–170° C., and contains 37.2% C, 4.4% H, and 54.7% F. This liquid also has a pour point of —80° C.

Fraction C is distilled to yield a product boiling at 260–280° C., and contains 36.0% C, 3.2% H and 58% F which corresponds to 1 to 3 units of tetrafluoroethylene and 6 units of 3,3,3-trifluoropropene-1 per molecule. The liquid has a pour point of —60° C.

On refluxing the redistilled liquid fractions in copper flasks for 100 hours and in the presence of air, no significant change occurs.

When this example was repeated using only 1 part (0.008 mole) of the catalyst, the yield of crude product was 60 parts which was separated into the following fractions:

A: 10% boiling at 80–105° C.
B: 64% boiling at 105–180° C.
C: 26% boiling at 180–290° C.

Further, when this example was repeated using only 60 parts (1.04 moles) of isobutane, 50 parts (0.5 mole) of tetrafluoroethylene, 10 parts (0.105 mole) of 3,3,3-trifluoropropene-1, and 6 parts of the catalyst, the yield of crude product was 93 parts which was separated into the following fractions:

A: 25% boiling at 80–105° C.
B: 52% boiling at 105–180° C.
C: 22% boiling at 180–290° C.
D: 1% wax.

EXAMPLE 3

Following the procedure of Example 1, 120 parts (2.08 moles) of isobutane, 6 parts (0.04 mole) of di-tertiarybutyl peroxide, 50 parts (0.5 mole) of tetrafluoroethylene and 72 parts (0.478 mole) of hexafluoropropene are charged into the reaction vessel, heated to 110° C. for about 2 hours and 151 parts of crude liquid product obtained. On distillation, the following fractions in percent by weight are obtained:

Fraction A: 52.6% B. R. 95–110° C.
Fraction B: 36.4% B. R. 110–164° C.
Fraction C: 11.0% B. R. 165–290° C.

Redistillation and analysis yields the following data:

| From Fraction— | Boiling Range, ° C. | Percent C | Percent H | Percent F | Pour Point, ° C. |
|---|---|---|---|---|---|
| A | 95–110 | 40.5 | 5.4 | 57.6 | Below —80 |
| B | 150–157 | 33.7 | 2.9 | 64.3 | Below —80 |
| C | 240–260 | 32.2 | 2.5 | 66.3 | —40 |

These products show no attack by copper at their boiling points over extended periods.

EXAMPLE 4

Following the general procedure of Example 1, 120 parts of isobutane (2.08 moles), 50 parts of vinylidene fluoride (0.78 mole), 50 parts of hexafluoropropene (0.33 mole) and 2 parts of di-tertiary-butyl peroxide catalyst were reacted at 110° C. to yield 75 parts of clear liquid product. On distillation, the liquid was separated into the following fractions:

A: 38:7% boiling at 104–180° C., pour point —90° C.
B: 51.6% boiling at 180–310° C., pour point —65° C.
C: 9.7% wax.

Fraction A contains 41% C and 55% F, and Fraction B contains 38.4% C and 55.4% F.

EXAMPLE 5

Following the details of Example 1, 60 parts (1.04 moles) of isobutane, 6 parts (0.04 mole) of di-tertiarybutyl peroxide catalyst, 50 parts (0.5 mole) of tetrafluoroethylene, 38 parts (0.5 mole) of vinylidene fluoride and 10 parts (0.104 mole) of 3,3,3-trifluoro-propene-1 are charged into the pressure vessel and heated for 6 hours at 110° C. An initial pressure of 850 p. s. i. g. is noted and, after reaction, the pressure is 350 p. s. i. g. The clear liquid (87 parts) is distilled to give four fractions:

Fraction A: 5% boiling range 80–105° C.
Fraction B: 21% boiling range 105–180° C.
Fraction C: 66% boiling range 180–394° C.
Fraction D: 8% greasy wax.

After redistillation the following data is obtained:

| From Fraction— | Boiling Range, ° C. | Percent C | Percent H | Percent F | Pour Point, ° C. |
|---|---|---|---|---|---|
| A | 80–100 | 52.7 | 8.0 | 36.0 | Below —80 |
| B | 150–155 | 47.8 | 7.2 | 45.9 | Below —80 |
| C | 240–260 | 35.3 | 3.2 | 61.6 | —30 |
|   | 370–380 | 34.8 | 2.6 | 62.7 | +15 |

These liquids show no significant decomposition on exposure to copper and air at their boiling point and up to 250° C. for the higher boiling fractions for over 100 hours.

The effect of an aromatic group in the telogen compound is illustrated by the following Example 6:

EXAMPLE 6

Following the details of Example 1, a reaction vessel is charged with 250 parts (2.09 moles) of isopropylbenzene (cumene) as telogen, 50 parts (0.5 mole) of tetrafluoroethylene, 38 parts (0.5 mole) of vinylidene fluoride and 10 parts (0.07 mole) of di-tertiary-butyl peroxide catalyst. The reaction vessel is then pressured with nitrogen to 8000 p. s. i. g. and the reaction carried out at 110° C. for 18 hours. On distilling the crude reaction product, 3 parts of a colorless liquid is obtained boiling at 260 to 300° C. and having an estimated pour point of 0° C., which analyzes 58.7% C, 4.5% H and 34.1% F, corresponding to one tetrafluoroethylene and one vinylidene fluoride unit per molecule of telomer.

Olefins, which contain 2 fluorine atoms in the molecule, are essential to produce the advantageous results of this invention. This is illustrated by the following Example 7:

EXAMPLE 7

Following the general procedure of Example 1, 120 g. (2.08 moles) of isobutane, 6 g. of di-tertiary-butyl peroxide catalyst, 50 g. (0.5 mole) of tetrafluoroethylene and 23 g. (0.5 mole) of vinyl fluoride were reacted at 110° C. for 7 hours. 77 g. of product were obtained which appeared as a soft wax. Distillation yielded 5.6 g. boiling between 90 and 110° C., 10.1 g. of high boiling waxes, and 39 g. of waxy residue. Total recovery is 54.7 g. The amount of liquid was insufficient to make a pour point determination. No high boiling liquids were found.

The following examples further show that it is essential to employ at least two different olefins in order to obtain the advantageous results and products of this invention:

EXAMPLE 8

Employing the procedure of Example 1, 500 g. of isobutane, 200 g. of vinylidene fluoride and 4 g. of di-tertiary-butyl peroxide were reacted at 110° C. to yield 129 g. of a white, waxy solid and no liquid products. When this experiment was repeated with 100 g. of isobutane, 80 g. of vinylidene fluoride and 6 g. of di-tertiary-butyl peroxide, there was obtained 28 g. of a solid wax and no liquid products. This was only slightly soluble in amyl acetate, to the extent of less than 3% by weight.

EXAMPLE 9

An autoclave was charged with 1.5 parts of benzoyl peroxide and, after evacuating, 125 parts of isobutane and 50 parts of tetrafluoroethylene were added. The autoclave was closed and heated at 110° C. for 7 hours. After cooling the reaction mixture to room temperature, the pressure was released carefully. Fractional distillation of the product yielded the following fractions:

| Fraction of Total | Boiling Point | Pour Point, ° C. | Liquid Range, ° C. |
|---|---|---|---|
| 38.8% | 79–80° C. | −78 | −78 to +80 |
| 33.6% | 125–125.5° C. | −74 | −74 to +125 |
| 25.2% | 164–169° C. | −65 | −65 to +169 |
| 2.4% | Wax, M.P., 45° C. | | |

In comparison to the above Example 9, the products boiling below 200° C. and prepared with two or more polyfluoro-olefins have pour points significantly lower (below −80° C.) than the telomer of tetrafluoroethylene alone. Many of the higher boiling liquids (which cannot be made from tetrafluoroethylene as the sole polyfluoroolefin) have pour points of −80° C. or below. Thus the liquid range of the liquid products of this invention is significantly larger or the pour point is considerably lower than those obtained from tetrafluoroethylene alone. Also, while the wax of Example 1 is soluble in amyl acetate to the extent of more than 10% by weight, the wax of this Example 9 is only slightly soluble in amyl acetate, i. e. to the extent of less than 3% by weight.

It is also well known that liquid telomer products, which have been proposed for use as lubricants, have been prepared from chlorotrifluoroethylene, employing chloroform or carbon tetrachloride as the telogen and then after-treating the product by fluorination with $CoF_3$ to remove unsaturation and other loosely held substituents and to stabilize the product. The properties of a representative, commercially available product (oil B) so prepared are compared in the following Table I with a representative product (oil A) of this invention prepared by the process of Example 1.

excellent (Exc.) thermal stability at 250° C., whereas oil B breaks down in 6 hrs. at this temperature. In addition, no decomposition products appear in oil A but oil B develops white deposits. Also of great significance is the fact that oil B causes pitting on copper at 250° C., while oil A shows no corrosion. Furthermore, oil A has a higher viscosity index (V. I.) than oil B.

One of the requirements of an acceptable lubricant is that it withstand the load to which it is subjected under use. That is, the lubricating film which separates the moving bearing surfaces must not be broken. The greater the load on the bearing surfaces the greater must be the film strength of the lubricant.

The lubricants of this invention have exceptionally good film strength under high loads as shown by the Almen film strength test. This test consists of rotating a steel cylindrical rod in a steel split bushing while the entire assembly is immersed in the test oil. Two-pound weights are added at ten second intervals as the rod rotates at 2000 R. P. M. The highest bearing load at which seizure occurs is recorded. A lubricant film which can withstand a bearing load exceeding about 10,000 p. s. i. is considered to be very good. The data in the following Table II indicate the excellent film strength of the lubricants of this invention in which a representative co-telomer (C) which is a redistilled fraction, having a boiling range of 250–310° C., from Fraction C of Example 1 is compared to well-known liquid lubricants:

Table II

| Lubricant | Almen Film Strength 2,000 R. P. M.—sliding speed 39 ft./min. P. s. i. |
|---|---|
| Co-telomer C | 12,000 |
| Mineral lubricating oil | 6,000 |
| Di(2-ethyl hexyl sebacate) | 6,000 |

The low boiling liquids of this invention are useful also as hydraulic fluids under those conditions where extremely low temperatures normally cause the oil to solidify and become of little value. The liquids of this invention are also useful to increase flash points of flammable solvents (snuffer agents). Merely mixing the solvent with the co-telomer oil results in a significant flash point increase. For example, 1% by weight of the co-telomer from isobutane, tetrafluoroethylene and vinylidene fluoride boiling at 100° C. increased the flash point of a kerosene based fuel 12.6° F. A cut boiling at 150° C. gave the same result and a cut boiling at 250° C. gave a 14.4° F. increase.

In some cases, a minor proportion of a co-telomer wax is obtained. Such wax is much more soluble in amyl acetate and like organic solvents than the solid telomers of single polyfluoro-monoolefins. Thereby, the co-telomer waxes of this invention are particularly adapted to be applied, in the form of solutions in amyl acetate and like solvents, as protective coatings to sur-

Table I

| Oil | Viscosity 210° F. | Viscosity 100° F. | ASTM Slope | V. I. | Pour Point, ° C. | Boil. Range, ° C. | Therm. Stab. in Air 210° C. | Therm. Stab. in Air 250° C. | Decomp. Prod. | Corrosion on Cu, 250° C. |
|---|---|---|---|---|---|---|---|---|---|---|
| A | 2.02 | 11.3 | 1.04 | −158 | −40 | 270–310 | Exc. | Exc. | none | none. |
| B | 6.0 | 100 | 1.0 | −181 | −15 | 250–300 | Exc. | 6 hrs. | white deposit | pitting. |

It should be noted that oil B has a liquid range from −15 to 300° C. whereas oil A is liquid from −40 to 310° C. This is 35 centigrade degrees, or about 10% greater. Both oils are thermally stable (Exc.) in air at 200° C. and showed no color change. Furthermore, oil A has faces and as impregnants for paper, textiles, and like materials to render them water and oil repellant.

It will be understood that Examples 1 to 5, inclusive, are given for illustrative purposes solely, and that this invention is not restricted to the specific embodiments disclosed therein. On the other hand, it will be readily apparent to those skilled in the art that, within the limits set forth in the general description, many variations and modifications can be made without departing from the spirit and scope of this invention. For example, the mixtures of polyfluoro-monoolefins may be composed of other polyfluoro-monoolefins of the class, a greater number of such polyfluoro-monoolefins, other proportions of the different polyfluoro-monoolefins to each other, and the like, with corresponding variations in the structure and the number of polyfluoro units in the polymer chains of the co-telomers. Likewise, the hydrocarbon telogens may be varied to vary the number of polymer chains and, to a small extent, the hydrocarbon portion of the co-telomer. Furthermore, the catalysts, the proportions thereof, the temperature, the other conditions, the apparatus, and the techniques employed may be widely varied.

From the preceding description, it will be apparent that this invention provides a simple, one-step process for readily preparing novel, saturated polyfluoro co-telomers. Particularly, this invention provides new compositions of matter which are co-telomers which have novel, very valuable advantageous properties and utilities. Accordingly, this invention constitutes a valuable contribution to and advance in the art.

The embodiments of the invention in which an exclusive property or privilege is claimed are defined as follows:

1. A co-telomer containing between 23% and 73% by weight of fluorine which consists essentially of one radical of an alkane of 4–18 carbon atoms containing at least one tertiary carbon atom for every 3–6 non-tertiary carbon atoms and a polymer chain terminated at one end by a tertiary carbon atom of the alkane radical and at the other end by hydrogen, said polymer chain consisting of 2–3 different polyfluoro units of the structure

wherein R is a member of the group consisting of fluorine, lower perfluoroalkyl and lower omega-hydroperfluoroalkyl groups and each X is a member of the group consisting of fluorine and hydrogen.

2. A normally liquid co-telomer containing between 23% and 73% by weight of fluorine which consists essentially of one radical of an alkane of 4–18 carbon atoms containing at least one tertiary carbon atom for every 3–6 non-tertiary carbon atoms and a copolymer chain terminated at one end by a tertiary carbon atom of the alkane radical and at the other end by hydrogen, said copolymer chain consisting essentially of a copolymer of a perfluoro-monoolefin of 2–6 carbon atoms and a polyfluoro-monoolefin of the formula $CH_2{=}R$ wherein R represents a perfluoroalkylidene radical of 1–5 carbon atoms.

3. A normally liquid co-telomer containing from about 35% to about 66% by weight of fluorine which consists of one tertiary alkyl radical of 4–6 carbon atoms containing a single tertiary carbon atom and a copolymer chain terminated at one end by the tertiary carbon atom of the alkyl radical and at the other end by hydrogen, said copolymer chain consisting essentially of a copolymer of a perfluoro-monoolefin of 2–6 carbon atoms and a polyfluoro-monoolefin of the formula $CH_2{=}R$ wherein R represents a perfluoro-alkylidene radical of 1–5 carbon atoms.

4. A normally liquid co-telomer containing from about 35% to about 66% by weight of fluorine which consists of one tertiary butyl radical and a copolymer chain terminated at one end by the tertiary carbon atom of the butyl radical and at the other end by hydrogen, said copolymer chain consisting essentially of a copolymer of a perfluoro-monoolefin of 2–6 carbon atoms and a polyfluoro-monoolefin of the formula $CH_2{=}R$ wherein R represents a perfluoro-alkylidene radical of 1–5 carbon atoms.

5. A normally liquid co-telomer containing from about 35% to about 66% by weight of fluorine which consists of one tertiary butyl radical and a copolymer chain terminated at one end by the tertiary carbon atom of the butyl radical and at the other end by hydrogen, said copolymer chain consisting essentially of a copolymer of tetrafluoro-ethylene and a polyfluoro-monoolefin of the formula $CH_2{=}R$ wherein R represents a perfluoro-alkylidene radical of 1–5 carbon atoms.

6. A normally liquid co-telomer containing from about 36.8% to about 62.4% by weight of fluorine and boiling in the range of about 130° C. to about 340° C. which consists of one tertiary butyl radical and a copolymer chain terminated at one end by the tertiary carbon atom of the butyl radical and at the other end by hydrogen, said copolymer chain consisting essentially of a copolymer of tetrafluoroethylene and vinylidene fluoride.

7. A normally liquid co-telomer containing from about 55% to about 65% by weight of fluorine which consists of one tertiary butyl radical and a copolymer chain terminated at one end by the tertiary carbon atom of the butyl radical and at the other end by hydrogen, said copolymer chain consisting essentially of a copolymer of hexafluoro-propene and a polyfluoro-monoolefin of the formula $CH_2{=}R$ wherein R represents a perfluoro-alkylidene radical of 1–5 carbon atoms.

8. A normally liquid co-telomer containing from about 55% to about 65% by weight of fluorine and boiling in the range of about 104° C. to about 310° C. which consists of one tertiary butyl radical and a copolymer chain terminated at one end by the tertiary carbon atom of the butyl radical and at the other end by hydrogen, said copolymer chain consisting essentially of a copolymer of hexafluoro-propene and vinylidene fluoride.

9. A normally liquid co-telomer containing between 23% and 73% by weight of fluorine which consists essentially of one radical of an alkane of 4–18 carbon atoms containing at least one tertiary carbon atom for every 3–6 non-tertiary carbon atoms and a copolymer chain terminated at one end by a tertiary carbon atom of the alkane radical and at the other end by hydrogen, said copolymer chain consisting essentially of a copolymer of a perfluoromonoolefin of 2–6 carbon atoms and a polyfluoro-monoolefin of the formula $CH_2{=}CH{-}R$ wherein R represents a perfluoro-alkyl radical of 1–4 carbon atoms.

10. A normally liquid co-telomer containing from about 35% to about 66% by weight of fluorine which consists of one tertiary butyl radical and a copolymer chain terminated at one end by the tertiary carbon atom of the butyl radical and at the other end by hydrogen, said copolymer chain consisting essentially of a copolymer of a perfluoro-monoolefin of 2–6 carbon atoms and a polyfluoro-monoolefin of the formula $CH_2{=}CH{-}R$ wherein R represents a perfluoro-alkyl radical of 1–4 carbon atoms.

11. A normally liquid co-telomer containing from about 35% to about 66% by weight of fluorine which consists of one tertiary butyl radical and a copolymer chain terminated at one end by the tertiary carbon atom of the butyl radical and at the other end by hydrogen, said copolymer chain consisting essentially of a copolymer of tetrafluoro-ethylene and a polyfluoro-monoolefin of the formula $CH_2{=}CH{-}R$ wherein R represents a perfluoro-alkyl radical of 1–4 carbon atoms.

12. A normally liquid co-telomer containing from about 37.8% to about 58% by weight of fluorine and boiling in the range of about 105° C. to about 290° C. which consists of one tertiary butyl radical and a copolymer chain terminated at one end by the tertiary carbon atom of the butyl radical and at the other end by hydrogen, said copolymer chain consisting essentially of a copolymer of tetrafluoro-ethylene and 3,3,3-trifluoropropene-1.

References Cited in the file of this patent

UNITED STATES PATENTS

| | | |
|---|---|---|
| 2,411,159 | Hanford | Nov. 19, 1946 |
| 2,436,135 | Barrick et al. | Feb. 17, 1948 |
| 2,440,800 | Hanford et al. | May 4, 1948 |
| 2,562,547 | Hanford et al. | July 31, 1951 |
| 2,598,283 | Miller | May 27, 1952 |
| 2,603,663 | Feasley et al. | July 15, 1952 |

UNITED STATES PATENT OFFICE
CERTIFICATE OF CORRECTION

Patent No. 2,856,440 October 14, 1958

Nikolaus E. Wolff

It is hereby certified that error appears in the printed specification of the above numbered patent requiring correction and that the said Letters Patent should read as corrected below.

Column 7, line 2, for "cooper" read -- copper --; columns 9 and 10, Table I, eighth column thereof, under the heading "Therm. Stab. in Air" for "210° C." read -- 200° C. --.

Signed and sealed this 17th day of February 1959.

(SEAL)
Attest:

KARL H. AXLINE
Attesting Officer

ROBERT C. WATSON
Commissioner of Patents